United States Patent
Wang et al.

(10) Patent No.: US 9,979,559 B2
(45) Date of Patent: May 22, 2018

(54) FEEDBACK IN A POSITIONING SYSTEM

(71) Applicant: PHILIPS LIGHTING HOLDING B.V., Eindhoven (NL)

(72) Inventors: Xiangyu Wang, Eindhoven (NL); Ashish Vijay Pandharipande, Eindhoven (NL); Armand Michel Marie Lelkens, Heerlens (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/110,864

(22) PCT Filed: Dec. 31, 2014

(86) PCT No.: PCT/EP2014/079488
§ 371 (c)(1),
(2) Date: Jul. 11, 2016

(87) PCT Pub. No.: WO2015/104211
PCT Pub. Date: Jul. 16, 2015

(65) Prior Publication Data
US 2016/0330041 A1  Nov. 10, 2016

(30) Foreign Application Priority Data

Jan. 10, 2014 (EP) .................................. 14150841
Jan. 17, 2014 (EP) .................................. 14151628

(51) Int. Cl.
*H04L 12/28* (2006.01)
*G01S 5/02* (2010.01)
(Continued)

(52) U.S. Cl.
CPC .......... *H04L 12/282* (2013.01); *G01S 5/0236* (2013.01); *G01S 5/0252* (2013.01);
(Continued)

(58) Field of Classification Search
CPC ....... H04W 4/02; H04W 4/021; H04W 4/025; H04W 4/04; H04W 4/043; H04W 12/08; H04W 4/001; H04W 8/18
See application file for complete search history.

(56) References Cited

U.S. PATENT DOCUMENTS 9,559,991 B1 * 1/2017 Wieber ................... H04L 51/02
9,574,894 B1 * 2/2017 Karakotsios ....... G01C 21/3617
(Continued)

FOREIGN PATENT DOCUMENTS

JP   2009150663 A   7/2009
WO   2013128059 A1  9/2013

OTHER PUBLICATIONS

A.K.M. Mahtab Hossain, et al., "Utilization of User Feedback in Indoor Positioning System," Ervasive and Mobile Computing 6 (2010) (15 pages).

*Primary Examiner* — Jean Gelin
(74) *Attorney, Agent, or Firm* — Meenakshy Chakravorty (57) ABSTRACT

The disclosure relates to an application server which provides a user of a mobile device with a location based service controlling functionality of an environment external to the mobile device, where the control of the functionality is conditional on an estimated location of the mobile device as estimated by a positioning algorithm. A feedback module is configured to infer a quality of the estimation from the behavior of the user, based on a manner in which the user interacts or attempts to interact with the functionality of the location based service. The feedback module then sends feedback of the inferred quality to the positioning algorithm.

12 Claims, 3 Drawing Sheets (51) Int. Cl.
*H04L 29/08* (2006.01)
*H04W 4/04* (2009.01)
(52) U.S. Cl.
CPC ............ *H04L 67/22* (2013.01); *H04W 4/043* (2013.01); *H04L 2012/2841* (2013.01)

(56) References Cited

U.S. PATENT DOCUMENTS

| | | |
|---|---|---|
| 2009/0111462 A1 | 4/2009 | Krinsky et al. |
| 2012/0002980 A1 | 1/2012 | Tse et al. |
| 2012/0059780 A1* | 3/2012 | Kononen .......... H04M 1/72522 706/14 |
| 2012/0286997 A1* | 11/2012 | Lin ....................... G01S 5/0252 342/451 |
| 2013/0017806 A1* | 1/2013 | Sprigg .................... H04M 1/66 455/411 |
| 2013/0162481 A1 | 6/2013 | Parvizi et al. |
| 2014/0005930 A1* | 1/2014 | Chu ....................... G01C 21/30 701/445 |
| 2014/0171149 A1* | 6/2014 | Jung ......................... H04M 3/42 455/556.1 |
| 2014/0274116 A1* | 9/2014 | Xu ........................... G01S 11/06 455/456.1 |

* cited by examiner

FEEDBACK IN A POSITIONING SYSTEM

CROSS-REFERENCE TO PRIOR APPLICATIONS

This application is the U.S. National Phase application under 35 U.S.C. § 371 of International Application No. PCT/EP2014/079488, filed on Dec. 31, 2014, which claims the benefit European Patent Application No. 14150841.6, filed on Jan. 10, 2014 and European Patent Application No. 14151628.6, filed on Jan. 17, 2014. These applications are hereby incorporated by reference herein.

TECHNICAL FIELD

The present invention relates to a location network for determining the location of a mobile device.

BACKGROUND

In an indoor positioning system, the location of a wireless device such as a mobile user terminal can be determined with respect to a location network comprising multiple anchor radios. These anchors are wireless nodes whose locations are known a priori, typically being recorded in a location database which can be queried to look up the location of a node. The anchor nodes thus act as reference nodes for location. Measurements are taken of the signals transmitted between the mobile device and a plurality of anchor nodes, for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration or triangulation. Given the relative location of the mobile terminal and the known locations of the anchor nodes, this in turn allows the location of the mobile device to be determined in more absolute terms, e.g. relative to the globe or a map or floorplan.

As well as indoor positioning, other types of positioning system are also known, such as GPS or other satellite-based positioning systems in which a network of satellites acts as the reference nodes. Given signal measurements from a plurality of satellites and knowledge of those satellites' positions, the location of the mobile device may be determined based on similar principles.

The determination of the device's location may be performed according to a "device-centric" approach or a "network-centric" approach. According to a device centric approach, each reference node emits a respective signal which may be referred to as a beacon or beaconing signal. The mobile device takes measurements of signals it receives from the anchor nodes, obtains the locations of those nodes from the location server, and performs the calculation to determine its own location at the mobile device itself. According to a network-centric approach on the other hand, the anchor nodes are used to take measurements of signals received from the mobile device, and an element of the network such as the location server performs the calculation to determine the mobile device's location. Hybrid or "assisted" approaches are also possible, e.g. where the mobile device takes the raw measurements but forwards them to the location server to calculate its location.

One application of a positioning system is to automatically provide a wireless mobile device with access to control of a utility such as a lighting system, on condition that the mobile device is found to be located in a particular spatial region or zone associated with the lighting or other utility. For instance, access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include for example payment of road tolls at toll booths or other location dependent payments.

As well as just trilateration, multilateration or triangulation, techniques now exist which determine the location of mobile device based on a "fingerprint" of a known environment. The fingerprint comprises a set of data points each corresponding to a respective one of a plurality of locations in the environment in question. Each data point is generated during a training phase by taking a measurement of the signals received from any reference nodes that can be heard at the respective location (e.g. a measure of signal strength such as RSSI) and storing this in a location server along with the coordinates of the respective location. The data point is stored along with other such data points in order to build up a fingerprint of the signal measurements as experienced at various locations within the environment.

Once deployed, the signals measurements stored in the fingerprint can then be compared with signal measurements currently experienced by a mobile user device whose location is desired to be known, in order to estimate the location of the mobile device relative to the corresponding coordinates of the points in the fingerprint. For example this may be done by approximating that the device is located at the coordinates of the data point having the closest matching signal measurements, or by interpolating between the coordinates of a subset of the data points having signal measurements most closely matching those currently experienced by the device.

The fingerprint can be pre-trained in a dedicated training phase before the fingerprint is deployed by systematically placing a test device at various different locations in the environment. Alternatively or additionally, the fingerprint can built up dynamically by receiving submissions of signal measurements experienced by the actual devices of actual users in an ongoing training phase.

One such fingerprint-based technique is disclosed in "Utilization of User Feedback in Indoor Positioning System"; A. K. M. Mahtab Hossain, Hien Nguyen Van and Wee-Send Soh; Pervasive and Mobile Computing (PMC), Elsevier, vol. 6, no. 4, pp. 467-481, August 2010 [Hossain et al]. When the user's location can be known by other means than the fingerprint, this location is fed back to a location server along with the currently experienced signal measurements in order to dynamically build a fingerprint of the environment. The location feedback may be explicit or implicit. Explicit feedback means the user knows his or her own actual location and submits this via a user interface, e.g. the user points to the known location on a user interface comprising a map or plan of the environment. Implicit feedback on the other hand is taken without the user being aware. Implicit feedback according to Hossain occurs when the user encounters certain landmarks as he or she goes about his or her business or daily routine, the locations of the landmarks being fixed and known to the system. For example when the user uses a card reader, the fact that the user was encountered at the known location of the card reader is automatically submitted to the location server along with the signal measurements experienced by that user's mobile device.

According to Hossain et al, each location is also stored in association with a weight w intended as a measure of the credibility of the location. The weight is taken into account in the fingerprint-based positioning algorithm such that points with a lower credibility are given less weight in determining the location of a device from the fingerprint.

SUMMARY

According to Hossain the feedback always includes an actual location, i.e. spatial coordinates. That is, the feedback is adding into the system an extra location data point that the positioning system could not obtain itself. This is so for both the explicit and implicit feedback of Hossain. For example the system suggests a starting point for a route, and the user can then explicitly give feedback by inputting a more accurate starting point than the system suggested. The feedback therefore takes the form of the coordinates at which the user believes him or herself to be located, and an associated weight which in this case is a measure of the credibility of the user. In another example the system receives implicit feedback when the user uses a card reader at a fixed location. In this case the feedback takes the form of the coordinates of the card-reader and the weight is set to 1 as the location of the card-reader is considered to be known.

However, it is recognized herein that feedback of the actual location is not always available or practical, but nonetheless it may still be possible to obtain and make use of feedback on the quality of an existing location estimate already estimated by the positioning algorithm (rather than the quality of a new location provided by the user themselves or another system that the positioning algorithm could not obtain itself, as in Hossain).

To do this, the present disclosure provides a mechanism for gaining implicit feedback while the user interacts with a location-based service providing some functionality in the user's external environment. Particularly, the feedback is based on observing the user's behavior, i.e. the way in which the user interacts with the location-based service.

According to one aspect disclosed herein, there is provided an application server for providing feedback on location estimates. The application server hosts an application configured to provide a user of a mobile device with a location based service which controls functionality of an environment external to the mobile device, with the control of the functionality being conditional on an estimated location of the mobile device as estimated by a positioning algorithm. The application server also comprises a feedback module configured to infer a quality of said estimation from a behavior of the user based on a manner in which the user interacts or attempts to interact with said functionality of the location based service, and to send feedback of the inferred quality to the positioning algorithm. The positioning algorithm is preferably implemented at a location server, in which case feedback module is configured to send the feedback to the location server (thought alternatively the positioning algorithm could be implemented locally at the mobile device).

In embodiments, unlike Hossain, the inferred quality may be fed back without any associated explicit feedback of the location itself, neither from the user nor from any other system for locating the mobile device.

The feedback on quality may be any indication concerning the reliability of the estimated location, and may be determined in a number of ways. For example in embodiments, the conditional control comprises allowing a user to control the functionality only in a region associated with the estimated location and not other regions, and the feedback module is configured to determine the quality based on the manner in which the user controls this functionality. To infer said quality, the feedback module may infer a lower quality in response to detecting that the user repeats an act of controlling or attempting to control said functionality multiple times during a time period, and a higher quality otherwise. Alternatively or additionally, the feedback module may infer a lower quality in response to detecting that the user reverses or attempts to reverse an act of controlling of said functionality during a time period, and a higher quality otherwise.

For instance, consider a scenario in which the location-based service comprises an application for controlling lighting in the user's vicinity. In this case the functionality comprises lighting for illuminating said environment, and which lights are controlled is conditional on the user's estimated position. If the user controls the lights, then tries again and/or reverses the control, this may imply the first attempt did not have the effect the user expected and therefore that the location estimate was inaccurate (because the user was estimated to be in one location and so the lights were controlled in the region of that estimated location, whereas the user was actually located at a different position and was expecting the lights to be controlled in the region of his or her actual location instead). An indication based on such a fact may be fed back to the location server as an indication of the quality of the location estimate.

The quality may be binary (e.g. representing "good" or "bad"), or may be quantitative over a finer scale. For example in embodiments, a number of repetitions during the time period is used to determine a degree of said quality, more repetitions implying lower quality. Alternatively the fact of whether or not there is a repeat or repetition of the control may be taken as a binary indication of good or bad quality.

In another example, to infer said quality, the feedback module may infer a lower quality in response to a detection of the user moving about by more than a predetermined amount and/or in an anomalous pattern within a time period following an act of controlling of said functionality, and a higher quality otherwise. For instance if the user controls the lights and then immediately moves in an unusual path (e.g. back and forth rather than in a consistent path such as towards a work station or a central region of the room), this may be indicative that the control has had an unexpected effect and the user is trying to coax the system into behaving in the desired way, or has backed away from entering a room or has deviated from his or her path because the lights did not turn on or off in the way expected. In embodiments a degree of said motion during the time period may be used to determine a degree of said quality, more motion implying lower quality. Alternatively or additionally, the fact of whether or not the user's motion matches a predetermined anomalous behavior pattern may be taken as a binary indication of good or bad quality.

Feedback on the quality of the estimated position may be used in order to improve the model used by the positioning algorithm, and therefore determine future location estimates more accurately.

Hence according to a further aspect disclosed herein, there may be provided a system comprising the application server and the location server, the location server comprising: a positioning module comprising the positioning algorithm, being configured to estimate the location of the mobile device based on a trainable model, and to communicate with the application server so that the application server can provide said location based service based on the estimated location of the mobile device as estimated by the location server; and a training module configured to receive the feedback from the application server, and to update the training of the model based on the feedback.

In embodiments, the trainable model may comprise a fingerprint of data points for a plurality of respective locations, each data point comprising a set of signal measurements taken from wireless signals received from a plurality of reference nodes at the respective location; and the adaptation of the model may comprise incorporating the feedback for the estimated location in said fingerprint. For example, the feedback gained by the above mechanisms could be used to update weighting factors in a continually-learning indoor positioning system.

According to further aspects disclosed herein, there are provided corresponding methods and computer program products for operating an application server, location server or overall system in accordance with any of the features disclosed herein.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF EMBODIMENTS

Figure 1:
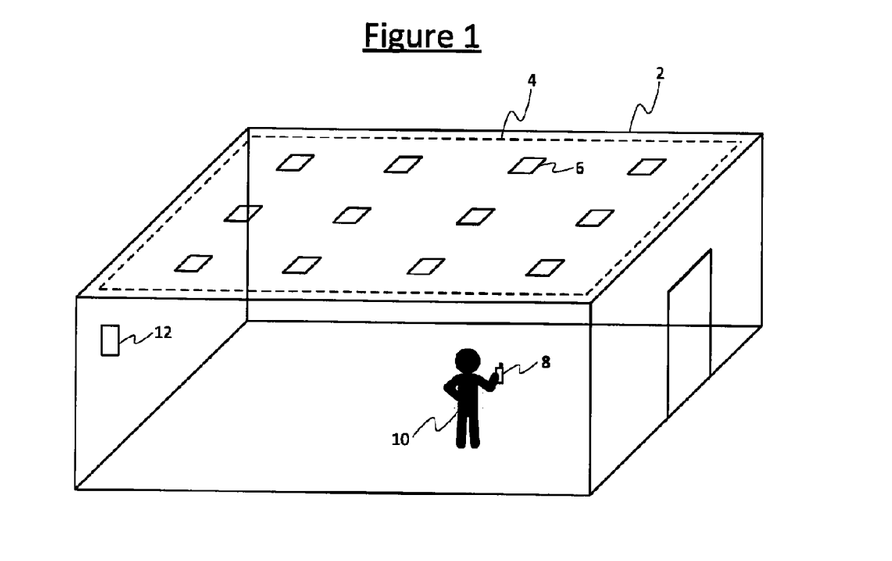
FIG. 1 is a schematic representation of an environment comprising an indoor positioning system.

FIG. 1 illustrates an example of a positioning system installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positing system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings.

In yet further embodiments the reference nodes 6 need not necessarily be dedicated anchor nodes of an indoor positioning system. Alternatively or additionally, the reference nodes may comprise other nodes having a knowable location, e.g. access points 12 of a WLAN or base stations of a cellular network can also be used for a secondary purpose of beaconing. The following will be described in terms of the reference nodes 6 being anchor nodes of a dedicated indoor positioning system or the like, but it will be appreciated this is not necessarily the case in all possible embodiments. Also, while the disclosure is described in terms of wireless radios, the disclosed techniques may be applied to other modalities such as visible light, infrared, microwaves, or ultrasound or other acoustic waves, etc.

The environment 2 is occupied by a user 10 having a wireless device 8 disposed about his or her person (e.g. carried or in a bag or pocket, or held in a hand). The wireless device 8 takes the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about a being or object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 12, being or object about which it is disposed.

Figure 2:
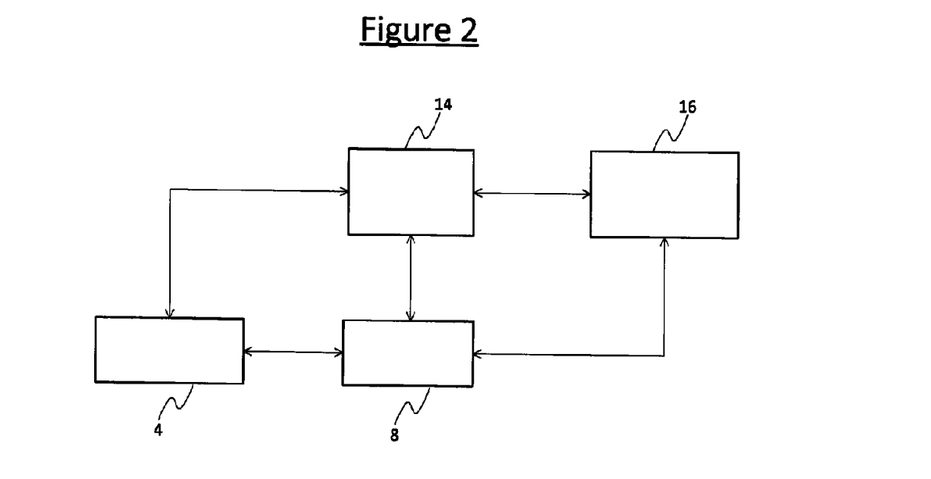
FIG. 2 is a schematic block diagram of a system for providing a location based service.
Figure 3:
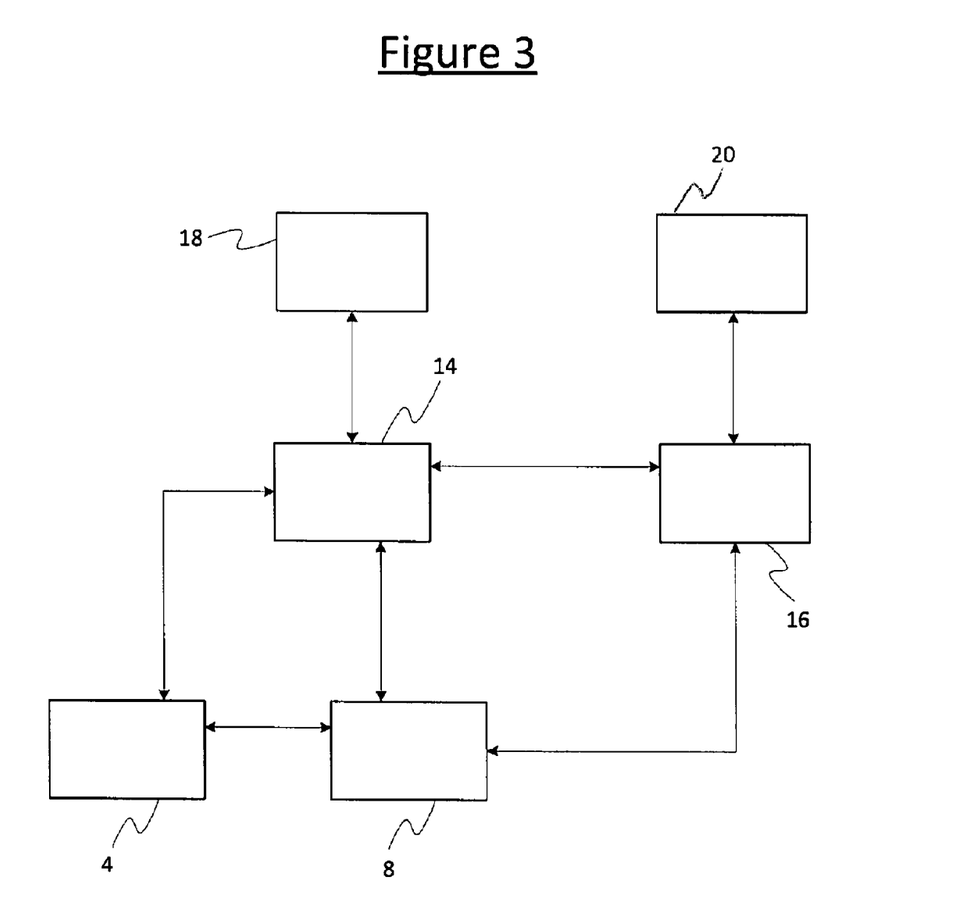
FIG. 3 is a schematic block diagram of a system for providing feedback from a location based service.

Referring to FIGS. 1, 2 and 3, the environment 2 also comprises at least one wireless access point or router 12 enabling communication with a location server 14. The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2. The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi, ZigBee or Bluetooth, using which each of the anchor nodes 6 is able to wirelessly communicate via the access point 12 and therefore with the location server 14. Alternatively it is not excluded that the anchor nodes 6 could be provided with a wired connection with the location server 14, but the following will be described in terms of a wireless connection via an access point 12 or the like.

The mobile device 8 is also able to communicate via the wireless access point 12 using the relevant radio access technology, e.g. Wi-Fi, ZigBee or Bluetooth, and thereby to communicate with the location server 14. Alternatively or additionally, the mobile device 8 may be configured to communicate with the location server 14 via other means such as a wireless cellular network such as a network operating in accordance with one or more 3GPP standards. Furthermore, the mobile device 8 is able to communicate wirelessly with any of the anchor nodes 6 that happen to be in range. In embodiments this communication may be implemented via the same radio access technology as used to communicate with the access point 12, e.g. Wi-Fi, ZigBee or Bluetooth, though that is not necessarily the case in all possible embodiments, e.g. the anchor nodes 6 may alternatively broadcast to the mobile device 8 on some dedicated localization radio technology (or other medium).

Generally any of the communications described in the following may be implemented using any of the above options or others for communicating between the respective entities 6, 8, 12, 14, 16 and for conciseness the various possibilities will not necessarily be repeated each time.

The signals between the anchor nodes 6 and the mobile device 8 are the signals whose measurements are used to determine the location of the mobile device 8. In a device centric approach the anchor nodes 6 each broadcast a signal and the mobile device 8 listens, detecting one or more of those that are currently found in range and taking a respective signal measurement of each. Each anchor node 6 may be configured to broadcast its signal repeatedly, e.g. periodically (at regular intervals). The respective measurement taken of the respective signal from each detected anchor node 6 may for example comprise a measurement of signal strength (e.g. RSSI), time of flight (ToF), angle of arrival (AoA), and/or any other property that varies with distance or location. In a network centric approach, the mobile device 8 broadcasts a signal and the anchor nodes 6 listen, detecting an instance of the signal at one or more of those nodes 6 that are currently in range. In this case the mobile device 8 may broadcast its signal repeatedly, e.g. periodically (at regular intervals). The respective measurement taken of each instance of the signal from the mobile device 8 may comprise a measure of signal strength (e.g. RSSI) or time of flight (ToF), angle of arrival (AoA), and/or any other property that varies with distance or location. In one example of a hybrid approach, the nodes 6 may take the measurements but then send them to the mobile device 8.

There are various options for the manner in which such measurements are started and conducted. For example, either the mobile device may initiate the transmission upon which the measurement is based, or the network may initiate the transmission. Both are possible, but it may have some impact how the rest of the process is implemented, in particular for time-of-flight measurements.

Time-of-flight measurements can be obtained by establishing either a one way transmission delay or a two-way transmission delay (round trip time, RTT). A measurement of one-way delay can suffice if all relevant elements in the network have a synchronized clock or can reference a common clock. In this case the mobile device 8 may initiate the measurement with a single message transmission, adding a timestamp (time or time+date) of transmission to the message (and preferably a message hash over the message content to prevent a malicious party performing replay attack or providing fake message time, e.g. in order to gain unauthorized access). If on the other hand the measurement is not based on a synchronized or common clock, the anchor or reference nodes 6 can still perform a measurement by bouncing individual messages back from the mobile device 8 and determining the round-trip time-of-flight. The latter may involve coordination from the nodes attempting to measure.

In the case of signal strength measurements, there are also different options for implementing these. The determination of distance from signal strength is based on the diminishment of the signal strength over space between source and destination, in this case between the mobile device 8 and anchor or reference node 6. This may for example be based on a comparison of the received signal strength with a-prior knowledge of the transmitted signal strength (i.e. if the nodes 6 or mobile device 8 are known or assumed to always transmit with a given strength), or with an indication of the transmitted signal strength embedded in the signal itself, or with the transmitted signal strength being communicated to the node 6 or device 8 taking the measurement node 6 via another channel (e.g. via location server 14).

Any one or a combination of these approaches or others may be applied in conjunction with the system disclosed herein. Whatever approach is chosen, once such a signal measurement is available from (or at) each of a plurality of the anchor nodes 6, it is possible to determine the location of the mobile device 8 relative to the location network 4 using a technique such as trilateration, multilateration or triangulation. Alternatively or additionally, the location of the device 8 may be determined according to a fingerprint based technique as will be discussed in further detail shortly.

In addition, the "absolute" locations of the anchor nodes 6 (or more generally reference nodes) are known, e.g. from a location database maintained by the location server 14, or by the respective location of each anchor node 6 being stored at the node itself. The absolute location is a physical location of the node in physical environment or framework, being known for example in terms of a geographic location such as the location on a globe or a map, or a location on a floorplan of a building or complex, or any real-world frame of reference.

By combining the relative location of the mobile device 8 with the known locations of the anchor nodes 6 or fingerprint data points used in the calculation, it is then possible to determine the "absolute" location of the mobile device 8. Again, the absolute location is a physical location in a physical environment or framework, for example a geographic location in terms of the location on a globe or a map, or a location on a floorplan of a building or complex, or any more meaningful real-world frame of reference having a wider meaning than simply knowing the location relative to the location network 4 alone.

In a device centric approach the mobile device looks up the locations of the relevant nodes 6 by querying the location server 14 (e.g. via the wireless access point 12), or alternatively may receive the respective location along with the signal from each node 6. The mobile device 8 then performs the calculation to determine its own location at the device 8 itself (relative to the location network 4 and/or in absolute terms). In a network centric approach on the other hand, the nodes 6 submit the signal measurements they took to the location server 14 (e.g. via the wireless access point 12), and the location server 14 performs the calculation of the device's location at the server 14 (again relative to the location network 4 and/or in absolute terms). In an example of an assisted or hybrid approach, the mobile device 8 may take the measurements of signals from the nodes 6 but submit them to the location server 14 in a raw or partially processed form for the calculation to be performed or completed there, using the known locations of the anchor nodes 6 or fingerprint data points.

By whatever technique the location is determined, this location may then be used to assess whether the mobile device 8 is granted access to some location-based service. To this end, there is provided an application server 16 running a location-based service, configured to conditionally grant access to the service in dependence on the absolute location of the mobile device 8. In a device centric approach the mobile device submits its determined absolute location (e.g. in terms of global coordinates, map coordinates or coordinates on a floor plan) to the application server 16 over a connection via the wireless access point 12 or other means such as a cellular connection. The application server 16 then assesses this location and grants the mobile device 8 with access to the service on condition that the location is consistent with provision of the service (and any other access rules that happens to be implemented, e.g. also verifying the identity of the user 10). In a network centric or assisted approach, the location server 14 submits the determined absolute location of the mobile device 8 to the application server 16, e.g. via a connection over a local wired or wireless network and/or over a wide area network or internetwork such as the Internet. Again, the application server 16 then assesses this location and grants the mobile device 8 with access to the service on condition that the location is consistent with provision of the service. Alternatively the location server 14 may send the absolute location to the mobile device 8, and the mobile device may then forward it on to the application server 16.

Examples of location-based services that may be provided in accordance with embodiments of the present disclosure include:

allowing control of a utility such as lighting from an application running on the mobile device 8, where the user can only control the lighting or utility in a given room or zone when found to be located in that room or zone, or perhaps another associated zone such as a designated control zone;

accepting location dependent payments from the mobile device on condition that the device 8 is present in a certain region, e.g. payments in shops, payment of road tolls, "pay as you drive" car rental, or entrance fees to venues or attractions.

For instance, in embodiments the application server 16 is configured to control access to a lighting network installed or otherwise disposed in the environment 2. In this case the environment 2 comprises a plurality of luminaires (not shown) and a lighting control system incorporating the access system provided by the application server 16. The luminaires may for example be installed in the ceiling and/or walls, and/or may comprise one or more free standing units. The luminaires are arranged to receive lighting control commands from the controller. In embodiments this may be achieved via the wireless access point 12 using the same radio access technology that the anchor nodes 6 and/or mobile device 8 use to communicate with the wireless access point 12, and/or the same radio access technology used to communicate the signals between the mobile device 8 and anchor nodes 6 in order to take the location measurements, e.g. Wi-Fi, ZigBee or Bluetooth. Alternatively the lighting controller may communicate with the luminaires by other means, e.g. a separate wired or wireless network. Either way, the access system 16 of the lighting controller is configured with one or more location dependent control policies. For example, a control policy may define that a user 10 can only use his or her mobile device 8 to control the lights in certain region such as a room only when found within that region or within a certain defined nearby region.

As another example control policy, the mobile device 8 only controls those luminaires within a certain vicinity of the user's current location.

With regard to security, provided that the localization messages are distributed internally within the localization system 4, 6, 14 security may be less of an issue; but in the case of two-way time of flight messages (RTT) for example, or where the reports are transmitted over a public network, it may be advantageous to provide them with a time-stamp (measurement time) or a nonce and/or to "hash" the messages (digital signature) so as to thwart any replay attacks on the network backbone. The same could be done with the measurement reports sent to the location server 14. Such measures are not essential but may be desirable in embodiments, particularly if the location-based service or functionality is susceptible to abuse or involves financial transactions or the like.

Note that FIGS. 2 and 3 show various communications with arrows in all directions to illustrate the possibilities of device centric, network centric and assisted (hybrid) approaches, but in any given implementation not all the communications shown need be bidirectional or indeed present at all. Network centric, device centric and assisted approaches are described by way of comparison, but the following embodiments will relate to an assisted case whereby the mobile device 8 takes measurements of signals it receives from anchor nodes 6 and uses these to determine its position with the assistance of the location server 14.

A fingerprint based positioning technique is now described with reference to FIGS. 3, 4 and 5.

Figure 5:
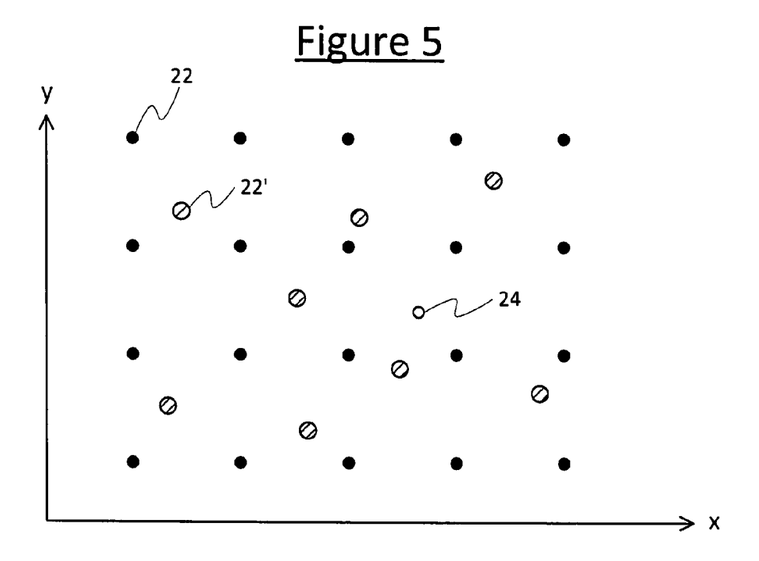
FIG. 5 is a schematic representation of a fingerprinting technique for positioning.

Referring to FIG. 5, the fingerprint comprises a store of pre-measured (already captured) data points 22, 22', each comprising the coordinates of a physical point in the environment 2 from which the data point was sampled and the measurements of the signals received from any reference nodes that could be heard at that point. Together the data points thus form a "fingerprint" of the environment in question, recording how the pattern of signals from the reference nodes "appeared" at each of a plurality of different locations within that environment, and thus how they may be approximately expected to appear assuming no major changes to the layout of the environment have taken place since the fingerprint was last updated. By reference to this pattern of signals, it is possible to approximate the location of a mobile device 8.

Figure 4:
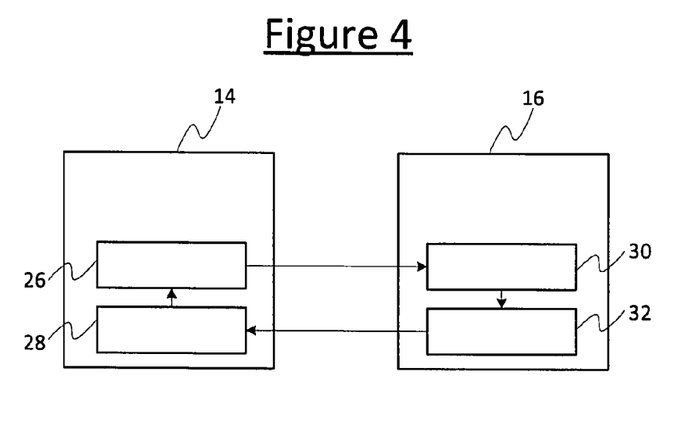
FIG. 4 is a schematic block diagram showing feedback from an application server to a location server.

Referring to FIGS. 3 and 4, in embodiments the fingerprint is stored at a database 18 of the location server 14. In this case the location server 14 hosts the database 18 and a positioning algorithm 26 for determining the location of a mobile device 8 relative to the points in the fingerprint.

Referring again to FIG. 5, the data points of the fingerprint may comprise pre-trained points 22 and/or dynamically trained points 22'. The pre-trained points are collected by a provider of the location server 14 by placing a wireless test device at a plurality of locations throughout the environment and recording readings of the signals received from the anchor nodes 6 at each location. Typically this is done prior to system deployment, but may also optionally be updated at convenient intervals. The pre-trained data points 22 may also be sampled systematically, e.g. according to a grid structure. The dynamically trained samples 22' on the other hand are collected by users "in the field", as and when they happen to be in the environment, e.g. going about their daily business or routine. If at any point the user happens to know his or her location, because the environment is familiar to that user, he or she may be given the option to voluntarily contribute to the fingerprinting system run by the server 14.

The user is presented with a user interface on his or her mobile device, allowing the user to input his or her current location and submit this to the location server 14 along with the signal measurements experienced from any anchor nodes currently within range. For example the user may be presented with a map or plan of the environment on the screen of his or her mobile device 8, on which the user can point to the current location, and an application on the mobile device converts this into coordinates to be sent to the location server 14 along with the corresponding signal measurements. The location server 14 incorporates this information as an extra data point 22' into the fingerprint maintained in the database 18. For example such a technique is disclosed by Hossain et al.

When another user 10 to whom the environment is unfamiliar wishes to be located, they can then benefit from comparison of their own signal measurements with those stored by the provider and/or previous users in the fingerprint database 18. To do this, an application running on the mobile device 8 of the user 10 in question takes signal measurements of the signals received from a plurality of anchor nodes 6 currently within range, and submits these measurements to the positioning algorithm 26 on the location server 14. The positioning algorithm 26 then compares the submitted signal measurements with some or all of those of the data points 22, 22' in the fingerprint. Based on this comparison, the positioning algorithm 26 can then compute an estimated location 24 of the mobile device 8. For instance, the positioning algorithm 26 may identify one of the data points 22, 22' having the closest matching signal measurements to those currently taken by the mobile device 8 (according to some metric such as minimizing mean square error or the like) and approximate that the mobile device 8 is located at the coordinates of the closest matching data point. Alternatively, the positioning algorithm 26 may identify a subset of the data points 22, 22' having the closest matching signal measurements to those currently taken by the mobile device 8, and approximate the location of the mobile device 8 by interpolating between the coordinates of the closest matching points. E.g. this basic positioning function of the algorithm 26 may operate as in Hossain et al or other known fingerprint based techniques.

Once the location estimate is obtained, the positioning algorithm 26 on the location server 14 then submits this result to at least one location based service (LBS) application 30 on the application server 16. Alternatively the location server 14 returns the location to the mobile device 8 which submits it onwards to the application server 16. Either way, the LBS application 30 processes the submitted location to determine whether the mobile device 8 (along with any other conditions such as verifying the user 10 and/or mobile device 8) is to be granted access to the functionality of the location based service, and if so to what extent. The LBS application 30 then enables the user 10 (if so granted) to control the relevant functionality.

A location based service is a service which provides control of some functionality of the environment external to the user 10 and mobile device 8, i.e. not just some function provided on the mobile device 8 itself such as a map application, but rather functionality of the building or other external surroundings which can be controlled via the mobile device 8. Furthermore, a location based service is by its nature conditional on the user's location (as approximated by the estimated location of the user's mobile device 8). This may mean that whether or not the user is granted access to the location based service is conditional on the user being within a certain region associated with the service. Alternatively or additionally, it may mean that which part or aspect of the functionality the user can control depends on his or her location, e.g. the user can only control the part or aspect of the system that affects or is located within the same region that the user is currently found in. For example the regions could be certain rooms, corridors and/or other zones of a building or complex. To this end, the application server 16 may comprise a map database 20 to electronically map out in which region or regions (e.g. which rooms or zones) a user 10 will be granted access to the functionality, and/or in which regions the user will be able to control which aspects or parts of the functionality.

For instance, the functionality may comprise a utility of a building such as lighting, heating, air conditioning or ventilation; or lighting in some other space; or some other functionality such as the ability to make a location based payment, e.g. at a toll booth. The lighting, utility or other functionality has a controller coupled to the application server 16 to be controlled by the LBS application 30 on condition that access is granted by the LBS application 30. The conditional nature of this functionality may be that the user 10 (via his or her mobile device 8) is only allowed to control the utility or make a payment on condition of being found (or rather estimated to be found) in a certain region. Alternatively or additionally, this may mean the for example that the user 10 can only control the lighting or utility in the room or corridor in which he or she is currently located, but not elsewhere. The following will be described in terms of lighting control as the primary example, but it will be appreciated that the disclosed techniques can also apply to other types of location based service such as those mentioned above.

As the functionality of the location based service is dependent on the location as estimated by the positioning algorithm 26, it would be desirable to be able to increase the accuracy of the localization performed by this algorithm. To at least some extent, this is in turn dependent on the reliability and/or density of samples (data points) in the fingerprint maintained in the database 18 of the location server 14.

As mentioned, Hossain et al discloses a system in which users can continually give explicit or implicit feedback of their location when known in order to augment the existing fingerprint. The feedback may also be associated with a weight w giving an indication of the credibility of the reported location. However, in Hossain the feedback always includes an actual reported location in terms of spatial coordinates, known by some other means than the fingerprint based positioning itself (because the user knows his or her location or the location is taken from another system of known landmarks). Such feedback is not always possible. It would be desirable to provide a mechanism which can provide feedback to a positing algorithm even in cases where feedback cannot be generated in terms of actual coordinate positions (x, y coordinates or the like).

Accordingly, embodiments of the present disclosure exploit observations on user interactions with the LBS application 30 to enable the LBS application server 16 to give feedback on the quality of location estimates made by the positioning algorithm 26. It is not required that the feedback be indicated explicitly by the user 10, but rather the LBS application server 16 comprises a feedback module 32 which is configured to observe the way in which the user interacts with the LBS application 30 and thereby determine whether previous location estimates are of sufficient quality for the user 10 and/or the application 30. Further, the location data with which the quality feedback is associated is not a new set of coordinates indicated by the user or by some other system (such as a system of landmarks), but rather it is the already-determined location estimate made by the positioning algorithm 26 on the location server 14. Thus it is possible to dynamically train the positioning algorithm 26 based on the quality of the location estimates it is providing, e.g. to dynamically adapt the fingerprint.

To this end, the feedback module 32 is arranged to receive information from the LBS application 30 regarding the way the user 10 is controlling the LBS application 30 via his or her mobile device 8. In embodiments, this information is used by the feedback module 32 to infer whether or not the control of the location based service is apparently having an effect that is in accordance with the user's expectation in terms of the zone or region being controlled relative to the user's position.

An example is in a zone-based lighting control system where the lighting is divided into zones, and the user is able to control the lighting only in the zone in which he or she is reported to be found by the location server 14. If a user 10 exercises control of the lights one single time and does not exercise further control (within some time window), this may be taken as a positive confirmation about the accuracy of the location estimate that was provided in order to enable the control of the lighting in the relevant zone. I.e. it may be assumed that the control probably had the effect the user was expecting. Conversely, if a user seems to move around a little and exercise control of lights a couple of times within a certain time window, this may indicate that the location estimate might have been wrong. I.e. it may be assumed that the control did not have the effect the user was expecting and so the user is now trying to rectify this and/or is behaving in an anomalous fashion. In both cases, the feedback module 32 on the LBS application server 16 observes this behavior and uses it to determine what the user's behavior means for the quality of the location estimate, and the sends (positive or negative) feedback of this directly back to the location server 14.

More generally, the quality could be inferred from any one or more of various observations indicative of anomalous behavior, such as anomalous commands or combinations of commands from the user 10 and/or anomalous movement of the user. Any such behavior may be taken as an indication that the control or attempted control of the utility or other function by the user 10 did not have the effect the user expected.

For example, it may be inferred that the control or attempted control of the lighting or other utility or function had an unexpected effect if any one or more of the following is observed: if the user 10 tries to repeat a control or attempted control multiple times within a predetermined time period, if the user reverses or attempts to reverse a control within a predetermined time period of said control, and/or if the user moves about within a predetermined time window after the control or attempting control. In the case of motion, this could be detected based on the amount of motion or by detecting an anomalous pattern, e.g. the user moves back and forth, in a circle or with sudden change of direction other than a straight or smooth line or a path consistent with a specific destination (the application server 16 may comprise a store of one or more predetermined pattern definitions for this purpose). The motion may be detected based on the location estimates performed by the location server 14 and location network 4, or based on other means such as accelerometer and/or magnetometer (compass) on the mobile device 8, and/or separate presence detecting system in the environment (e.g. a passive infrared or active ultrasound occupancy detection system).

The feedback of the quality of the location estimate can be binary (the estimate was either "good" or "bad"), or it can be a confidence level indicating a soft probabilistic metric. For example, the number of repetitions or amount of motion may be used to determine a degree of quality.

Whatever form it takes, the feedback module 32 feeds back an indication of the inferred quality from the LBS application server 16 to a training module 28 on the location server 14 (via any suitable communication means between the application server 16 and location server 14, e.g. via a connection over a local wired or wireless network and/or over a wide area network or internetwork such as the Internet).

The training module 28 uses the feedback on the quality of the location estimates provided by the location server 14 in order to improve the accuracy and reliability of the positioning system. For instance, if the feedback is a positive feedback indicating a high quality, then earlier measurements such as received signal strengths that were collected in the location server 14 to compute the high quality position estimates can be given a higher weight in the positioning algorithm 26 and/or the resulting position estimates in the future can be assigned with a high reliability indicator. Conversely if a negative feedback is provided, those measurements that were used to compute the low quality position estimates can be recorded such that in the future measurements with similar patterns can be given a lower weight in the positioning algorithm 26 and/or the computed position estimates can be given a low reliability indicator. In this way positioning performance of the location server can be continuously improved by making use of the feedback on the earlier positioning estimates it provides to the LBS application server.

In embodiments, the training module 28 is configured to use the feedback to dynamically adapt the fingerprint in the database 18. This may comprise associating weightings with the existing signal measurements in the database 18 in the manner discussed in the paragraph above. Alternatively or additionally, the feedback may be used to incorporate a new data point into the fingerprint. In this case, as well as the feedback on quality, the location server 14 also has the current signal measurements that the mobile device 8 experienced (i.e. those used to obtain the location estimate). These are the signal measurements that would supposedly be experienced at the estimated location 24 if the estimate was 100% accurate (refer again to FIG. 5). Based on this, the fingerprint may be augmented by converting the location estimate 24 into one of the user-contributed data points 22' of the fingerprint, but stored in association with a weighting based on the quality feedback in order to indicate that it is a less-than-perfect point (and in embodiments to what degree this is so). When a future estimate of location is performed, any data points with a lower weight will be given a low weighting in the positioning algorithm 26 and any data points with a higher weight will be given a higher weighting in the positioning algorithm 26. If the quality of a new point was indicated as good, the new data point may be taken as being almost as good as one of the existing points 22, 22' gathered by other means, and the weighting reflects this. If the quality was bad, it will not be very helpful but it will not contribute much to the next estimate. Alternatively (e.g. in the case of binary feedback) the quality feedback could be used to determine whether or not a location estimate 24 is converted into a new data point 22' in the fingerprint, with "good" estimates being included and "bad" estimates being discarded. In embodiments, the training and location estimation based on weight could be performed in a similar manner to that disclosed by Hossain et al, using the feedback on quality to give the weighting, but with at least some of the feedback being obtained in a different manner.

It will be appreciated that the above embodiments have been described by way of example only.

For instance, the above has been described in terms of a network-assisted approach whereby the mobile terminal 8 gathers measurements of the beaconing signals it can currently hear and submits them to the location server 14 to perform the location estimate based on the fingerprint as stored at a database 18 of the location server 14. In the case where the fingerprint comprises dynamically trained points 22', this means the users contribute communally to a fingerprint maintained at a centralized database. However, in alternative embodiments, it would be possible for a fingerprint to be stored and/or accumulated locally at mobile device 8 instead of communally at a location server 14, and for the positioning algorithm 26 to be implemented on the mobile device 8 so that the mobile device can estimate its own location in a fully device centric manner without the involvement of a location server 14. In this case, the feedback module 32 of the application server 16 may supply the feedback on quality directly back to the mobile device 8. Further, the feedback module 32 need not necessarily be implemented at the application server but could instead be implemented at the mobile device 8 (which is also able to observe how the user interacts in relation to the location based service).

In another alternative, the disclosed techniques may be applied to a network centric case rather than a device centric or network assisted case. In this case, the data points of the fingerprint comprise measurements of signals as heard by reference nodes 6 from a mobile device 8. However, this may be less preferred as it requires a consistent broadcast beaconing signal strength from devices, or for information on the broadcast strength to be incorporated into the model as well.

The feedback itself may be implemented in a variety of ways and is not limited to the examples given above. Generally any other anomalous behavior may be used to infer the quality of the location estimate, where such behavior is not consistent with how the user would be expected to interact in relation to the location based service if the location estimate upon which the service depends was accurate. Furthermore, the extent of the present disclosure need not be limited to fingerprint based positioning techniques, and the feedback could be used to inform, train, grade or assess the performance of other kinds of positioning algorithm such as those based on trilateration, multilateration, triangulation, fingerprints or any combination of these or other techniques.

Note also that it is not necessary in all embodiments that the control of the location based service is performed from a mobile device 8 or from the same mobile device 8 that is being located by the positioning algorithm 26. For example the mobile device 8 may be used to locate the user 10, and then having located the user 10 on the assumption that the mobile device 8 is about his or her person then the user 10 may be allowed to control the relevant functionality of the service using gesture control or even another device (though such embodiments may be less preferred for security reasons).

The functionality of the mobile device 8, location server 14 and location based application server 16, including the feedback module 32 and training module 28, may be implemented in software stored on storage of the relevant server or device and configured so as when executed on a processor of that server or device to perform the described operations. Alternatively it is not excluded that some of the functionality may be implemented in dedicated hardware circuitry, or configurable or reconfigurable circuitry.

Where a server is referred to herein, note that this is not necessarily limited to a single server unit or a server located at any one single site. Generally a server may be implemented in one or more units distributed across one or more sites. Somewhat similarly, where a processor is referred to, this does not necessarily limit to a single core or chip and generally a processor may be implemented on one or more cores and/or chips.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An application server, communicatively coupled with one or more memories and one or more processors, the server comprising:
    an application, executing on the one or more processors, and configured to provide a user of a mobile device with a location based service controlling functionality of an environment external to the mobile device, the control of the functionality being conditional on an estimated location of the mobile device as estimated by a positioning algorithm; and
    a feedback module, executing on the one or more processors, configured to infer a quality of said estimated location from a behavior of the user based on a manner in which the user interacts or attempts to interact with said functionality of the location based service, and to send feedback of the inferred quality to the positioning algorithm for improving accuracy of the estimated location,
    wherein to infer said quality, the feedback module:
        infers a lower quality in response to detecting that the user repeats an act of controlling or attempting to control said functionality multiple times during a time period, and a higher quality otherwise,
        infers a lower quality in response to detecting that the user reverses or attempts to reverse an act of controlling of said functionality during a time period, and a higher quality otherwise, or
        infers a lower quality in response to a detection of the user moving more than a predetermined amount or in an anomalous pattern within a time period following an act of controlling of said functionality, and a higher quality otherwise.

2. The application server of claim 1, wherein the conditional control comprises allowing the user to control the functionality only in a region associated with the estimated location and not other regions, and the feedback module is configured to determine the quality based on the manner in which the user controls said functionality.

3. The application server of claim 1, wherein said functionality comprises lighting for illuminating said environment.

4. The application server of claim 1, wherein a number of repetitions during the time period is used to determine a degree of said quality, more repetitions implying lower quality.

5. The application server of claim 1, wherein a degree of said motion during the time period is used to determine a degree of said quality, more motion implying lower quality.

6. The application server of claim 1, wherein the inferred quality is fed back without any associated explicit feedback of the location itself, neither from the user nor any other system for locating the mobile device.

7. The application server of claim 1, wherein the positioning algorithm is implemented at a location server, and the feedback module is configured to send the feedback to the location server.

8. A system comprising the application server of claim 7 and the location server, the location server comprising:
    a positioning module, executing on the one or more processors, comprising the positioning algorithm, being configured to estimate the location of the mobile device based on a trainable model, and to communicate with the application server so that the application server can provide said location based service based on the estimated location of the mobile device as estimated by the location server; and
    a training module, executing on the one or more processors, configured to receive the feedback from the application server, and to update the training of the model based on the feedback.

9. The system of claim 8, wherein the trainable model comprises a fingerprint of data points for a plurality of respective locations, each data point comprising a set of signal measurements taken from wireless signals received from a plurality of reference nodes at the respective location; and wherein the adaptation of the model comprises incorporating the feedback for the estimated location in said fingerprint.

10. A method comprising:
    providing a user of a mobile device with a location based service controlling functionality of an environment external to the mobile device, the control of the functionality being conditional on an estimated location of the mobile device as estimated by a positioning algorithm;
    automatically inferring a quality of said estimated location from a behavior of the user based on a manner in which the user interacts or attempts to interact with said functionality of the location based service; and
    supplying feedback of the inferred quality to the positioning algorithm for improving accuracy of the estimated location,
    wherein inferring said quality comprises:
        inferring a lower quality in response to detecting that the user repeats an act of controlling or attempting to control said functionality multiple times during a time period, and a higher quality otherwise,
        inferring a lower quality in response to detecting that the user reverses or attempts to reverse an act of controlling of said functionality during a time period, and a higher quality otherwise, or
    inferring a lower quality in response to a detection of the user moving more than a predetermined amount or in an anomalous pattern within a time period following an act of controlling of said functionality, and a higher quality otherwise.

11. The method of claim 10, wherein the positioning algorithm comprises a trainable model, the method comprises updating the training of the model based on the feedback.

12. A non-transitory computer program product for providing feedback in a system where an application server provides a user of a mobile device with a location based service controlling functionality of an environment external to the mobile device, and the control of the functionality is conditional on an estimated location of the mobile device as estimated by a positioning algorithm; wherein the computer program product comprises code embodied on a computer-readable storage medium and configured so as when executed on the application server to perform operations of:
    inferring a quality of said estimated location from a behavior of the user based on a manner in which the user interacts or attempts to interact with said functionality of the location based service, and
    supplying feedback of the inferred quality to the positioning algorithm for improving accuracy of the estimated location,
    wherein inferring said quality comprises:
        inferring a lower quality in response to detecting that the user repeats an act of controlling or attempting to control said functionality multiple times during a time period, and a higher quality otherwise,
        inferring a lower quality in response to detecting that the user reverses or attempts to reverse an act of controlling of said functionality during a time period, and a higher quality otherwise, or
        inferring a lower quality in response to a detection of the user moving more than a predetermined amount or in an anomalous pattern within a time period following an act of controlling of said functionality, and a higher quality otherwise.

* * * * *